US007281374B2

(12) United States Patent
Obayashi et al.

(10) Patent No.: US 7,281,374 B2

(45) Date of Patent: Oct. 16, 2007

(54) HYDRAULIC DEVICE FOR ELEVATING/LOWERING CHAIR

(75) Inventors: Toshihiko Obayashi, Osaka (JP); Masaya Miyazaki, Osaka (JP); Kaori Haruna, Osaka (JP)

(73) Assignee: Takara Belmont Corporation, Osaka-Shi (JP)

( * ) Notice: Subject to any disclaimer, the term of this patent is extended or adjusted under 35 U.S.C. 154(b) by 0 days.

(21) Appl. No.: 11/390,464

(22) Filed: Mar. 28, 2006

(65) Prior Publication Data

US 2006/0225415 A1 Oct. 12, 2006

(30) Foreign Application Priority Data

Mar. 31, 2005 (JP) .......................... P2005-103892

(51) Int. Cl.
*F16D 31/02* (2006.01)
*A61G 13/02* (2006.01)

(52) U.S. Cl. ...................... 60/477; 60/482; 297/344.19

(58) Field of Classification Search .................. 60/413, 60/442, 477, 482; 297/344.16, 344.19
See application file for complete search history.

(56) References Cited

U.S. PATENT DOCUMENTS 2,672,917 A * 3/1954 Collura ........................ 60/413
3,763,651 A * 10/1973 Okiyama ..................... 60/477
6,993,905 B2 * 2/2006 Min et al. ...................... 60/477
2003/0213665 A1 11/2003 Min et al. .............. 188/322.19

FOREIGN PATENT DOCUMENTS

| | | |
|---|---|---|
| CH | 445 754 | 2/1968 |
| DE | 814 698 | 9/1951 |
| DE | 1 529 565 | 8/1969 |
| DE | 43 40 236 A1 | 6/1994 |
| EP | 0 416 606 | 3/1991 |

* cited by examiner

*Primary Examiner*—Thomas E. Lazo
(74) *Attorney, Agent, or Firm*—Kratz, Quintos & Hanson, LLP.

(57) ABSTRACT

A chair elevating/lowering hydraulic device includes at least a foot pump 3 which absorbs oil by an ascent of an operation lever 1, which discharges oil stored by a stepping-on of the operation lever, and which discharges stored oil by a stepping-on of the operation lever to a lowest position, a check valve 5 which is opened by the oil pressure of the oil discharged from the foot pump, which is opened when the foot pump is lowered to the lowest position, and which allows the oil from the non-return side to pass to allow it to return to an oil tank through the foot pump, an elevating/lowering cylinder 7, and an accumulator 6.

7 Claims, 5 Drawing Sheets

HYDRAULIC DEVICE FOR ELEVATING/LOWERING CHAIR

BACKGROUND OF THE INVENTION

1. Field of the Invention

The present invention relates to an improvement on a hydraulic device for elevating/lowering a chair of barbering/beautification or dentistry, particularly of barbering, whose seat part's elevation is performed through technician's stepping on an operation lever which is for stepping on at the time of performance of technique, said hydraulic device controlling elevation and descent of the chair through stepping on of the operation lever.

2. Description of the Related Art

Regarding a conventional chair, for example, regarding a chair of barbering/beautification, there are a chair in which hydraulic fluid is supplied to a hydraulic cylinder, utilizing a pump of an electric pump and a chair in which hydraulic fluid is supplied to a hydraulic cylinder, through stepping on the above-mentioned operation lever by a foot. Regarding an elevating/lowering device for a chair in which the electric pump is utilized, for example, there is a device described in Japanese Utility Model Application Laid-Open No. H4-52634. In such a device in which a chair is elevated through such an electric pump, a seat part is elevated to a desired position continuously since hydraulic fluid is supplied to the hydraulic cylinder continuously by means of the pump. Accordingly, such a device has not given a shock to a seating person who receives technician's work while the seat is being elevated.

On the other hand, in a case of a simple chair in which hydraulic fluid is supplied from an oil tank through stepping on an operation lever by a foot (which is popularly adopted for beauty treatment, for example, in a case of a chair which is introduced in a web site of the present applicant company, since hydraulic fluid for one time is supplied from a hydraulic cylinder to an elevating/lowering cylinder through one time stepping, it is necessary to step on the operation lever a plurality of times to elevate a person who receives technician's work to a desired height position.

In the device in which oil is supplied to the elevating/lowering cylinder through stepping on the operation lever by a foot, since the oil supply to the elevating/lowering cylinder is stopped every time the operation lever is stepped, there is a problem that the seat part is stopped every time oil supply to the hydraulic cylinder is stopped so that such a device gives shock to the person who receives technician's work and gives him/her an uncomfortable feeling.

SUMMARY OF THE INVENTION

The present invention is to solve the above-described problem, and it is an object of the present invention to provide a chair elevating/lowering hydraulic device which allows oil stored in an accumulator to be supplied to an elevating/lowering cylinder between a stepping-on and a next stepping-on of an operation lever so that the elevating/lowering cylinder ascends continuously without stopping, and thus the device does not give a person who receives technician's work any shock and an uncomfortable feeling, and in which by stepping on the operation lever to a lowest portion, since a control lever attached to a foot pump as a unit allows an oil discharge valve to be opened so that oil inside the elevating/lowering cylinder and the accumulator can be returned to a tank, the structure can be simple, and the cost can be reduced.

The chair elevating/lowering hydraulic device of the present invention is to achieve the above-described object, and the means of first aspect is characterized in that the hydraulic device comprises: a foot pump which absorbs oil by an ascent of an operation lever, which discharges oil stored by a stepping-on of the operation lever, and which discharges stored oil by a stepping-on of the operation lever to a lowest position; a check valve which is opened by the oil pressure of the oil discharged from the foot pump, which is opened when the foot pump is lowered to the lowest position, and which allows the oil from the non-return side to pass to allow it to return to an oil tank through the foot pump; an elevating/lowering cylinder which is for elevating/lowering a seat part and which is coupled with the non-return side of the check valve through flow rate regulating means such as an orifice or the like; and an accumulator storing part of oil when oil from the foot pump is supplied through the first check valve; wherein the device stores part of oil supplied from the foot pump in the accumulator and supplies it also to the elevating/lowering cylinder so as to elevate it, the device keeps the elevating/lowering cylinder ascending by oil stored in the accumulator when oil supply from the foot pump is stopped, and the device allows oil inside the accumulator and elevating/lowering cylinder to return to the oil tank through the inside of the foot pump when the check valve is opened by the foot pump.

The means of second aspect is characterized in that the hydraulic device comprises: a foot pump which absorbs oil by an ascent of an operation lever, which discharges oil stored by a stepping-on of the operation lever, and which discharges stored oil by a stepping-on of the operation lever to a lowest position; a first check valve which is opened by the oil pressure of the oil discharged from the foot pump, which is opened when the foot pump is lowered to the lowest position, and which allows the oil from the non-return side to pass to allow it to return to an oil tank through the foot pump; an accumulator storing part of oil when oil from the foot pump is supplied through the first check valve; flow rate regulating means such as an orifice or the like which reduces the flow rate of the oil supplied from the foot pump through the first check valve; a second check valve which is coupled in parallel with the flow rate regulating means to block the flow of the oil from the foot pump; and an elevating/lowering cylinder which is coupled with the first flow rate regulating means and the second check valve; wherein the device stores part of oil supplied from the foot pump in the accumulator and supplies it to the elevating/lowering cylinder through the first flow rate regulating means so as to elevate it, the device allows oil stored in the accumulator to be supplied to the elevating/lowering cylinder through the flow rate regulating means to elevate it when oil supply from the foot pump is stopped, the device allows oil from the accumulator to be returned from the first check valve to the oil tank through the foot pump when the first check valve is opened by the foot pump, and the device allows oil inside the elevating/lowering cylinder to be returned from the second check valve to the oil tank through the foot pump.

The means of third aspect is characterized in that in the above-described claim 1 or 2, a second accumulator of a small capacitance is coupled in parallel with the accumulator and is provided for mitigating shocks of starting times and stopping times of a descent of the elevating/lowering cylinder.

The means of fourth aspect is characterized in that in the above-described second aspect, flow rate regulating means such as a second orifice or the like is formed in the second check valve, and the means of fifth aspect is characterized in that in the above-described second aspect, the second orifice is formed on an oil discharge path of the foot pump.

As described above, in the present invention, since the device stores part of oil supplied from the foot pump in the accumulator and supplies it also to the elevating/lowering cylinder so as to elevate it, keeps the elevating/lowering cylinder ascending by oil stored in the accumulator when oil supply from the foot pump is stopped, and allows oil inside the accumulator and elevating/lowering cylinder to return to the oil tank through the inside of the foot pump when the check valve is opened by the foot pump, the elevating/lowering cylinder ascends continuously without stopping even at the time of stopping of the operation lever at the time of an ascent of the elevating/lowering cylinder so as not to give a seating person who receives technician's work any shock and an uncomfortable feeling. Further, when the check valve allows oil to pass in a reverse direction, since oil in the accumulator and the elevating/lowering cylinder is allowed to return simultaneously to the oil tank, even a descent of the elevating/lowering cylinder is performed without any shock, without giving a person who receives technician's work an uncomfortable feeling. Furthermore, since movement of oil to the oil tank is performed through the foot pump, miniaturization of the entire hydraulic device can be achieved.

Since oil discharge from the elevating/lowering cylinder to the tank is performed through the second check valve, oil supply to the elevating/lowering cylinder and oil discharge have different paths, so that the ascent speed and descent speed of the elevating/lowering cylinder can be changed.

Since the amount of oil discharge from the second check valve can be regulated through the second orifice, the descent speed of the elevating/lowering cylinder can be fast, and speeding up of performing technique can be achieved.

Since the accumulator which operates at a low pressure is coupled in series with a large capacitance accumulator, oil from the small capacitance accumulator is gradually returned to the oil tank at the time of starting and stopping of a descent of the elevating/lowering cylinder, and thus advantageous effects such as no shock at the time of starting and stopping are yielded.

BEST MODE FOR CARRYING OUT THE INVENTION

Figure 1:
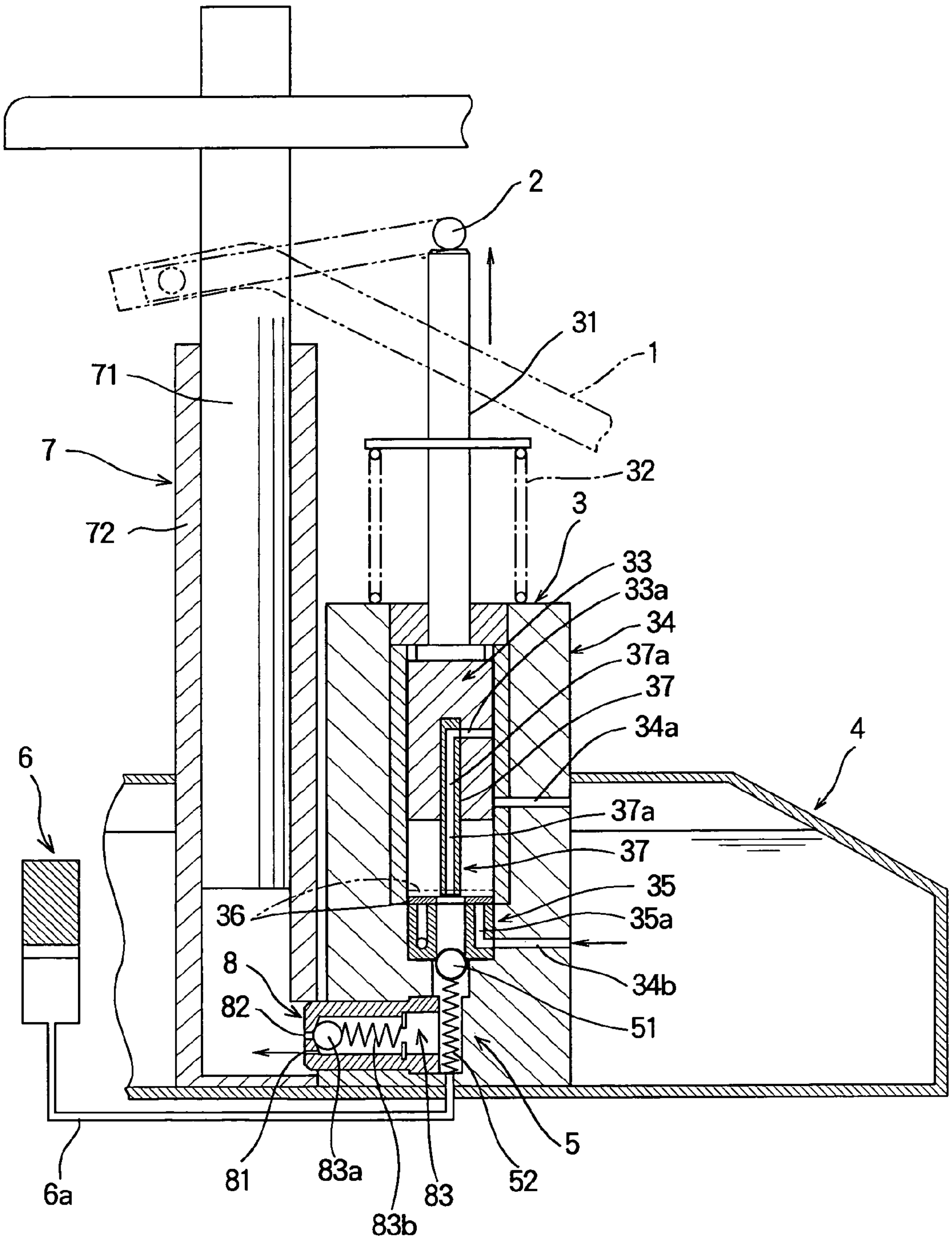
FIG. 1 is a cross-sectional view, showing one embodiment of a hydraulic device for elevating/lowering a chair according to the present invention, of the time of a state in which a piston of a foot pump is elevated to absorb oil from an oil tank.
Figure 2:
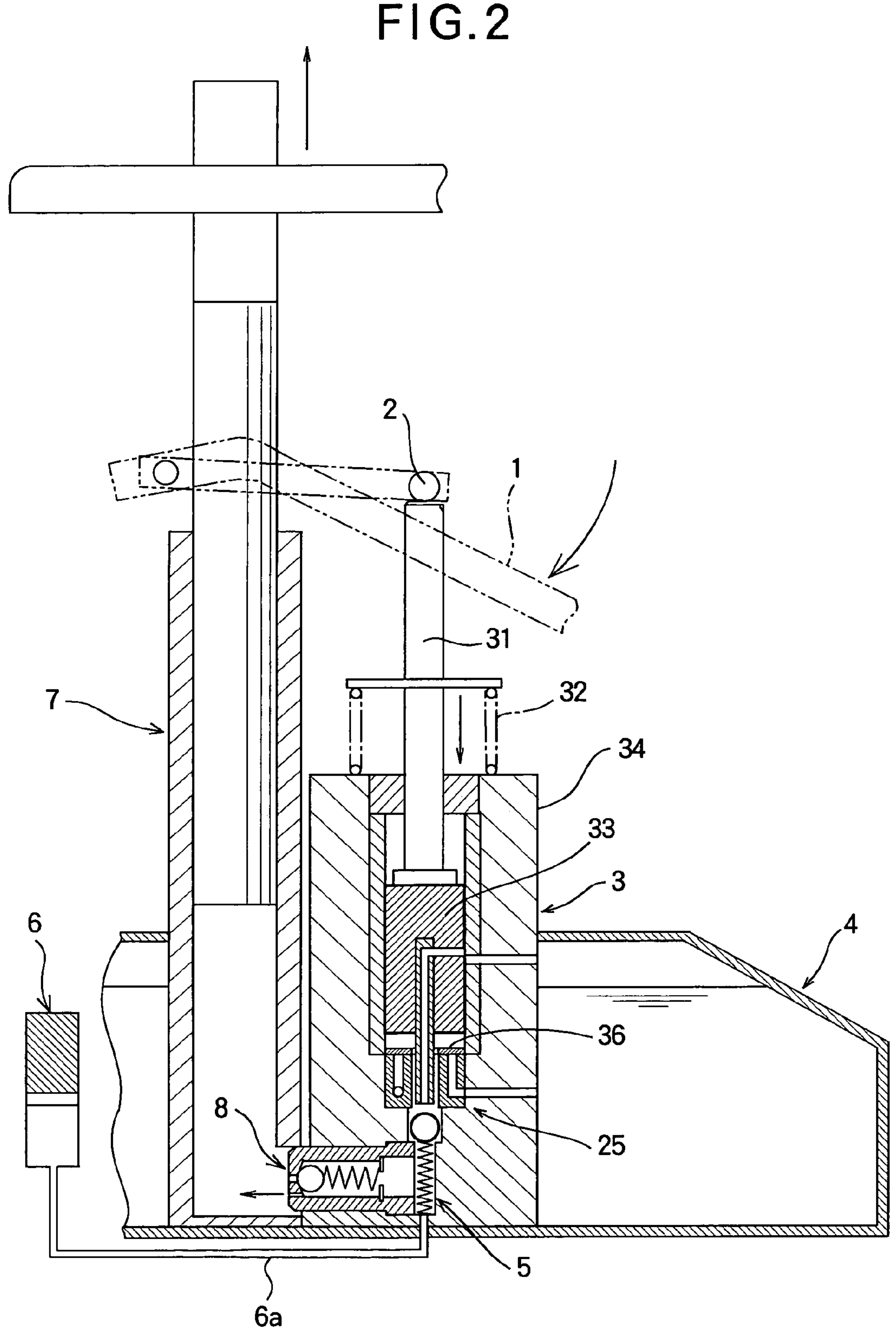
FIG. 2 is a cross-sectional view of a state in which the cylinder is lowered to supply oil to an elevating/lowering cylinder and an accumulator.
Figure 3:
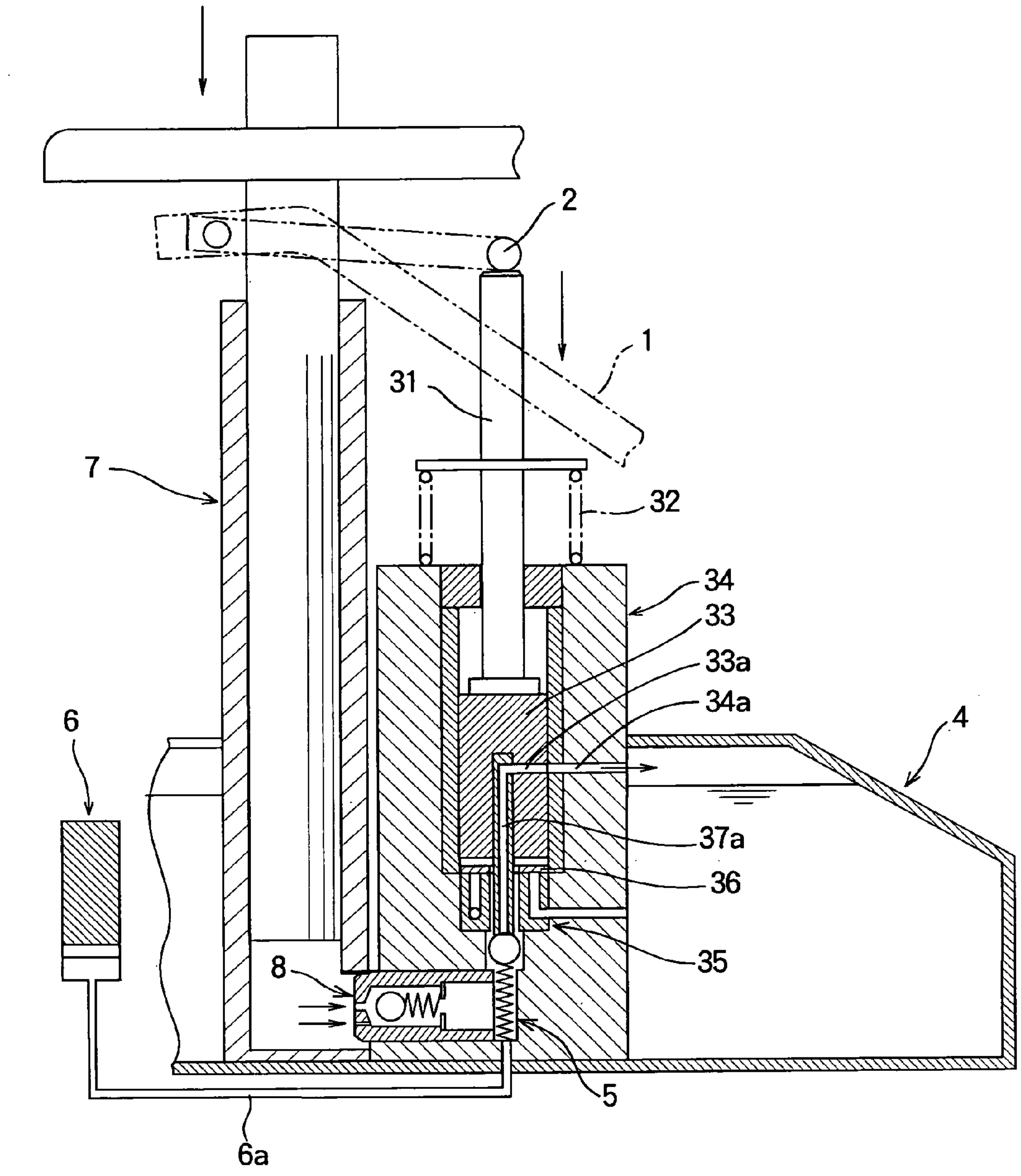
FIG. 3 is a cross-sectional view of a state in which the cylinder is at a lowest position to return oil inside the elevating/lowering cylinder and the accumulator to the oil tank.
Figure 4:
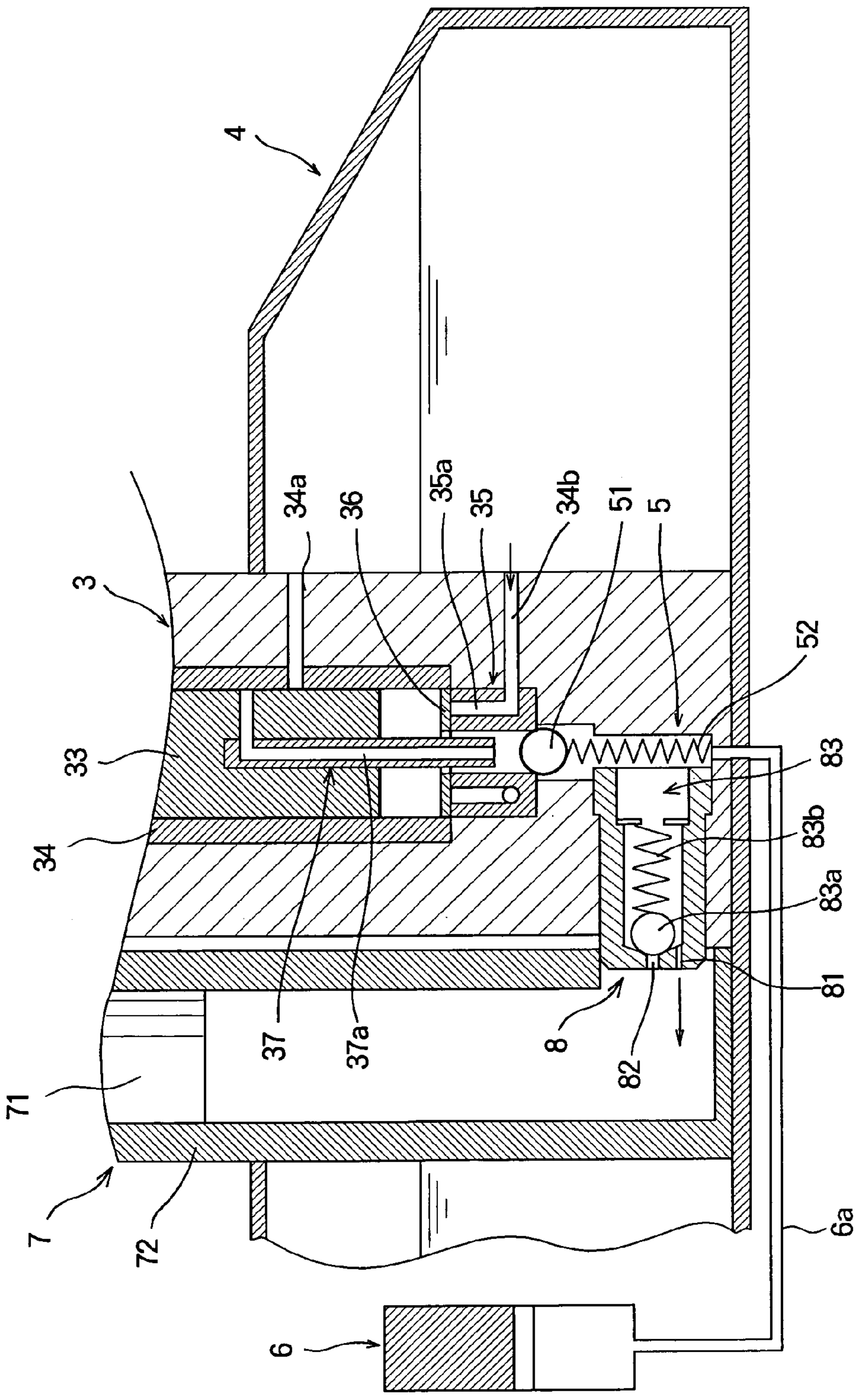
FIG. 4 is an enlarged cross-sectional view of a main part of FIG. 2.

In the present invention, oil stored in an accumulator is supplied to an elevating/lowering cylinder between stepping on of an operation lever and the next stepping on of the operation lever so that the elevating/lowering cylinder can be elevated continuously, and the lowering of the elevating/lowering cylinder can be performed by allowing a foot pump to descend to a lowest position.

First Embodiment

One embodiment of a hydraulic device for elevating/lowering a chair according to the present invention will be described below with reference to FIGS. 1-5.

Reference numeral 1 denotes an operation lever which is rotatably supported on an unillustrated main body case and which is rotated by stepping on of a technician's foot, reference numeral 2 denotes a press lever which rotates with the operation lever 1, and reference numeral 3 denotes a foot pump through which a piston rod 31 descends to compress oil stored in a cylinder 32 when the operation lever 1 is stepped on to rotate the press lever 2 downwardly.

The foot pump 3 is composed of the piston rod 31 which descends by means of the press lever 2 against the spring force of a spring 32, a piston 33 attached to this piston rod 31, and a cylinder 34 which stores oil through an ascent of this piston 33, and a lower part of the cylinder 34 is accommodated in an oil tank 4.

In the cylinder 34, an oil discharge hole 34*a* opening to the oil tank 4 is formed, and an oil supply hole 34*b* opening at a portion on which oil of the oil tank 4 exists is formed. In a bottom part of the cylinder 34, a valve body 35 in which a vertical oil supply hole 35*a* which communicates with the oil supply hole 34*b* is formed is incorporated. On this valve body 35 placed is a valve 36 which is for opening the vertical oil supply hole 35*b* to absorb oil from the oil tank 4 when the piston 33 ascends and which is for closing it when the piston 33 descends.

A control lever 37 having an oil discharge hole 37*a* which is for allowing a ball 51 of a first check valve 5 which will be described later to descend against the spring force of a spring 52 is incorporated in an axial longitudinal direction of the piston 33. In the piston 33, formed is a communication hole 33*a* for allowing the oil discharge hole 34*a* and the oil discharge hole 37*a* to communicate with each other when this piston 33 reaches the lowest position.

The first check valve 5 composed of the ball 51 and the spring 52 which spring biases this ball 51 is incorporated in a lower part of the valve body 35 in the cylinder 34, and a gas type accumulator 6 is connected to a lower part of the check valve 5 through a pipe 6*a* which also serves as an orifice. Since this accumulator 6 is constructed separately from the foot pump 3 and a later-described elevating/lowering cylinder 7, in a case where there is a hydraulic device composed only of the foot pump 3 and the elevating/lowering cylinder 7, by adding the accumulator 6 and the pipe 6*a* which also serves as an orifice later on, effects of the present invention can be obtained.

This gas type accumulator 6 has a structure in which gas in a gas chamber is compressed when oil is supplied and in which when supply of this oil is released, stored oil is discharged. As the accumulator 6, although a gas type is more effective for miniaturization, it is not necessarily limited to a gas type, and it may be a spring type.

Reference numeral 7 denotes the elevating/lowering cylinder in which a seat part of a barbering/beautification chair is rotatably supported on an upper part of an elevating/lowering lever 71, and a valve member 8 composed of flow rate regulating means 81 (hereinafter referred to as a first orifice) which is capable of a first flow rate regulation, flow rate regulating means 82 (hereinafter referred to as a second orifice) which is capable of a second flow rate regulation, and a second check valve 83 is attached between a lower part oil chamber in a cylinder 72 and the first check valve 5 in the foot pump 3.

The second check valve 83 in the valve member 8 is formed into a cylindrical shape such that one end is opened and the other end forms a second orifice 82 which reduces the flow rate of the oil, and the inside thereof is composed of a ball 83*a* which seals the second orifice 82 and a spring 83*b* which spring biases this ball 83*a*, and a first orifice 81 is formed, on the wall surface on which the second orifice 82 is formed, at a position which is not closed by the ball 83*a*.

Figure 5:
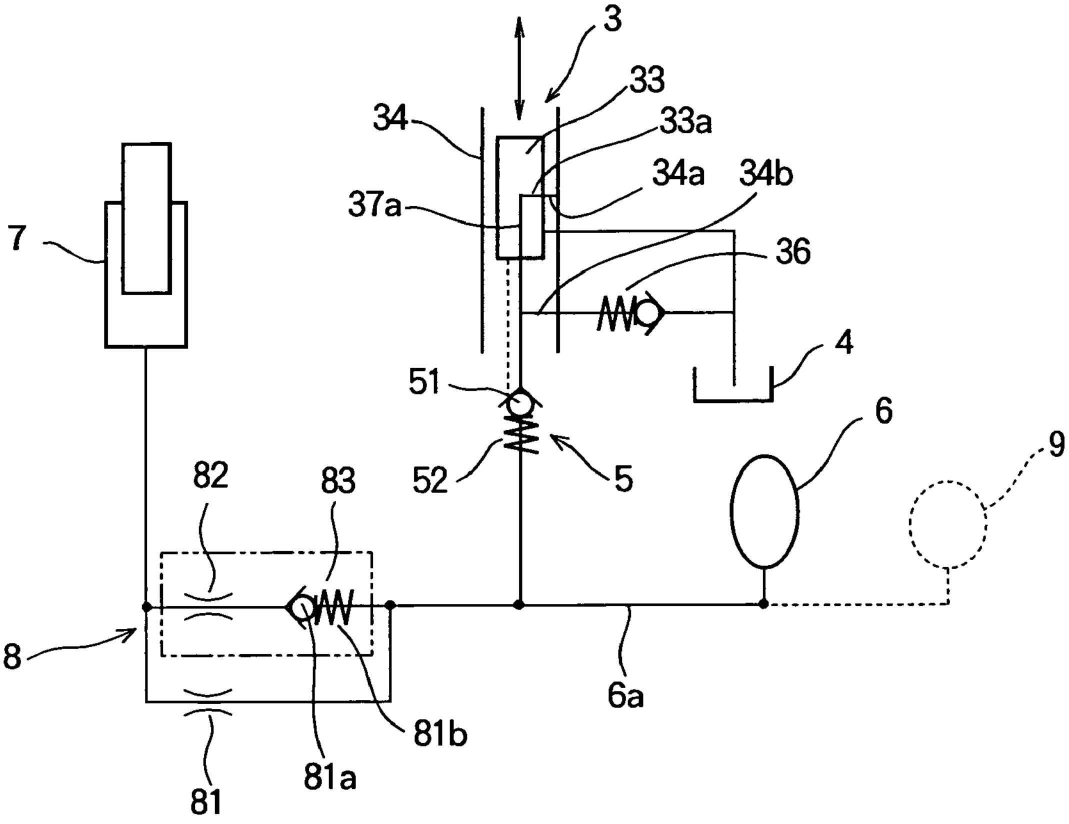
FIG. 5 is a hydraulic circuit of the hydraulic device for elevating/lowering a chair of the present invention.

FIG. 5 shows the chair elevating/lowering hydraulic device as a hydraulic circuit and shows the members which are the same as those of the above-described structure by means of the same reference numerals.

In this hydraulic circuit, reference numeral 36 is shown by the mark of a check valve because the valve 36 absorbs oil from the oil tank 4 when the piston 33 ascends to cause the oil chamber to be in a negative pressure, and because the valve 36 closes the vertical oil supply hole 35*a* when the piston 33 descends. As a result, it operates similarly to a check valve. Therefore, it is shown by the mark of a check valve.

Reference numeral 9 shows another accumulator which is connected in parallel to the accumulator 6. Regarding this accumulator 9, in a case where the accumulator 6 has a large capacitance and where, for example, the diameter thereof is 12-24 mm, and the gas pressure is 1.3-2.5 MPa, the accumulator 9 will have a small capacitance where the diameter thereof is 4-12 mm and where the gas pressure thereof is 0.5-1.0 MPa. By adopting this accumulator 9, at the time of starting descent of the piston 71 and at the time of stop thereof in the elevating/lowering cylinder 7, shocks can be reduced. While a case has been described where the capacitances of the accumulators 6, 9 differ from each other, strokes of the pistons of the two accumulators 6, 9 may be differ from each other.

Next, operations of the chair elevating/lowering hydraulic device of the present invention will be described based on the above-described structure.

First, in a state in which the piston of the elevating/lowering cylinder 7 is at the lowest position and in which oil is discharged into the accumulator 6 by the gas pressure, when a technician steps on the operation lever 1 to rotate it, since the press lever 2 also rotates, the piston of the foot pump 3 descends, and the oil inside the oil chamber downwardly presses the ball 51 of the first check valve 5 against the spring force of the spring 52 through the gap between the valve 36 and the control lever 37 and the gap between this control lever 37 and the valve body 35. Accordingly, the oil is supplied to the elevating/lowering cylinder 7 through the first orifice 81 of the valve member 8 and is also supplied to the accumulators 6, 9 through the pipe 6*a*.

Here, since the smaller the diameter of the first orifice 81, the smaller the amount of oil supplied to the accumulators 6, 9 becomes, and since the larger the diameter, the larger the amount becomes, in a case where the elevation speed of the piston 71 is made high, the diameter of the first orifice 81 is made large. Conversely, in a case where the speed is made low, the diameter is made small. Thus, it is necessary to determine them according to the design of a manufacturing time.

When the foot is removed from the operation lever 1, the piston 3l ascends by means of the spring 32. Due to this elevation, since the inside of oil chamber of the foot pump 3 becomes a negative pressure, the valve 36 is pulled upwardly, and oil is stored inside the oil chamber from the oil tank 4 through the oil supply hole 34*b* and the vertical oil supply hole 35*a*.

On the other hand, when the oil supply from the foot pump 3 is stopped, since mainly the oil stored inside the accumulator 6 is pressured by the gas pressure, the oil inside the accumulator 6 is supplied from this accumulator 6 through the pipe 6*a* to the oil chamber of the elevating/lowering cylinder 7 through the first orifice 81 of the valve member 8. Accordingly, since the piston of the elevating/lowering cylinder 7 is continuously elevated even when oil supply from the foot pump 3 stops, the piston 71 ascends smoothly, and the device does not give the seating person who receives technician's work any shock and an uncomfortable feeling.

Since the accumulator 6 is connected with the same path as that for supplying from the foot pump 3 to the elevating/lowering cylinder 7, at the time of moving upward and downward of the piston 71 of the elevating/lowering cylinder 7, shock can be reduced by the oil of the accumulator 6.

Thereafter, similarly, by stepping on the operation lever 1, oil is supplied from the foot pump 3 to the elevating/lowering cylinder 7, and then by removing the foot from the operation lever 1, oil is supplied from the accumulator 6. Thus, such operations will be repeated until the seat part reaches a desired height position.

Next, operations for allowing the seat part to descend for example in a case where performing technique is completed will be described. In this case, when the operation lever 1 is stepped on to the lowest position so that the piston 33 is lowered to the lowest position, since the control lever 37 allows the ball 51 in the first check valve 5 to descend against the spring force of the spring 52, the valve member which has been closed by the ball 51 of the valve body 35 is opened, and at this position, the oil discharge hole 34*a* and the oil discharge hole 37*a* are communicated through the communication hole 33*a*. Thus, the oil stored in the accumulator 6 is returned to the oil tank 4.

Meanwhile, since the oil which has been stored inside the elevating/lowering cylinder 7 is returned to the inside of the oil tank 4 through the same path as that of the oil from the accumulator 6 through the first orifice 81, and since the ball 83*a* of the second check valve 83 is withdrawn against the spring force of the spring 83*b* by the oil pressure stored inside the elevating/lowering cylinder 7, the stored oil is returned to the oil tank 4 through the second orifice 82 as well as the orifice 81.

Accordingly, since the oil stored in the elevating/lowering cylinder 7 is discharged through the first and second orifices 81, 82, the descent speed of the piston 71 becomes high, so that speeding up for a next work can be achieved. Although this descent stops at the time when the remaining amount of the oil inside the accumulator 6 and the elevating/lowering cylinder 7 becomes a predetermined amount, since oil discharge from the elevating/lowering cylinder 7 and the accumulators 6, 9 are simultaneously performed, at the times of starting and stopping a descent of the piston 71, a descent is smoothly performed without yielding any shock.

When a foot is removed from the operation lever 1 during a descent of the piston 71, since the ball 51 of the first check valve 5 closes the valve portion by the spring force of the spring 52, the oil from the elevating/lowering cylinder 7 is stored inside the accumulators 6, 9 through the first and second orifices 81, 82, to wait for a next ascent of the piston 71.

In the embodiment described above, although a device in which the second orifice 82 is formed in the valve member 8 is shown, the second orifice 82 may be formed on a flow path of a descent time of the communication hole 33*a* formed in the piston 33 in the foot pump 3, or on the oil discharge hole 34*a* formed the cylinder 34, or on the oil discharge hole 37*a*, or the like.

POSSIBILITY OF INDUSTRIAL UTILIZATION

The hydraulic device for elevating/lowering a chair of present invention is not limited to a barbering/beautification chair and can be applied to other chairs of a foot stepping type or to a bed, or the like.

What is claimed is:

1. A hydraulic device for elevating/lowering a chair comprising:
   - a foot pump which absorbs oil by an ascent of an operation lever, which discharges oil stored by a stepping-on of the operation lever, and which discharges stored oil by a stepping-on of the operation lever to a lowest position;
   - a check valve which is opened by the oil pressure of the oil discharged from the foot pump, which is opened when the foot pump is lowered to the lowest position, and which allows the oil from the non-return side to pass to allow it to return to an oil tank through the foot pump;
   - an elevating/lowering cylinder which is for elevating/lowering a seat part and which is coupled with the non-return side of the check valve through flow rate regulating means such as an orifice; and
   - an accumulator storing part of oil when oil from the foot pump is supplied through the first check valve;
   - wherein the device stores part of oil supplied from the foot pump in the accumulator and supplies it also to the elevating/lowering cylinder so as to elevate it, the device keeps the elevating/lowering cylinder ascending by oil stored in the accumulator when oil supply from the foot pump is stopped, and the device allows oil inside the accumulator and elevating/lowering cylinder to return to the oil tank through the inside of the foot pump when the check valve is opened by the foot pump.

2. A hydraulic device for elevating/lowering a chair comprising:
   - a foot pump which absorbs oil by an ascent of an operation lever, which discharges oil stored by a stepping-on of the operation lever, and which discharges stored oil by a stepping-on of the operation lever to a lowest position;
   - a first check valve which is opened by the oil pressure of the oil discharged from the foot pump, which is opened when the foot pump is lowered to the lowest position, and which allows the oil from the non-return side to pass to allow it to return to an oil tank through the foot pump;
   - an accumulator storing part of oil when oil from the foot pump is supplied through the first check valve;
   - flow rate regulating means such as an orifice which reduces the flow rate of the oil supplied from the foot pump through the first check valve;
   - a second check valve which is coupled in parallel with the flow rate regulating means to block the flow of the oil from the foot pump; and
   - an elevating/lowering cylinder which is coupled with the first flow rate regulating means and the second check valve;
   - wherein the device stores part of oil supplied from the foot pump in the accumulator and supplies it to the elevating/lowering cylinder through the first flow rate regulating means so as to elevate it, the device allows oil stored in the accumulator to be supplied to the elevating/lowering cylinder through the flow rate regulating means to elevate it when oil supply from the foot pump is stopped, the device allows oil from the accumulator to be returned from the first check valve to the oil tank through the foot pump when the first check valve is opened by the foot pump, and the device allows oil inside the elevating/lowering cylinder to be returned from the second check valve to the oil tank through the foot pump.

3. The chair elevating/lowering hydraulic device according to claim 1, wherein a second accumulator is coupled in parallel with the accumulator, the second accumulator operating at a low pressure and being provided for mitigating shocks of starting times and stopping times of a descent of the elevating/lowering cylinder.

4. The chair elevating/lowering hydraulic device according to claim 1, wherein flow rate regulating means such as a second orifice is formed in a second check valve.

5. The chair elevating/lowering hydraulic device according to claim 2, wherein flow rate regulating means such as a second orifice is formed on an oil discharge path of the foot pump.

6. The chair elevating/lowering hydraulic device according to claim 2, wherein a second accumulator is coupled in parallel with the accumulator, the second accumulator operating at a low pressure and being provided for mitigating shocks of starting times and stopping times of a descent of the elevating/lowering cylinder.

7. The chair elevating/lowering hydraulic device according to claim 2, wherein flow rate regulating means such as a second orifice is formed in the second check valve.

* * * * *